United States Patent [19]

Andresen

[11] 4,229,993
[45] Oct. 28, 1980

[54] ACTUATING DEVICE

[76] Inventor: Herman J. Andresen, 1330 Woodlawn Ave., Glenview, Ill. 60025

[21] Appl. No.: 894,338

[22] Filed: Apr. 7, 1978

[51] Int. Cl.³ ............................................. G05G 5/06
[52] U.S. Cl. ...................................... 74/538; 74/475
[58] Field of Search ................. 74/524, 529, 475, 538, 74/536, 537

[56] References Cited

U.S. PATENT DOCUMENTS

| | | | |
|---|---|---|---|
| 175,964 | 4/1876 | Garland | 74/538 |
| 858,538 | 7/1907 | Remington | 74/538 |
| 1,078,107 | 11/1913 | Nygren | 74/475 |
| 4,126,054 | 11/1978 | Langford et al. | 74/475 |

*Primary Examiner*—Kenneth Dorner
*Attorney, Agent, or Firm*—Neuman, Williams, Anderson & Olson

[57] ABSTRACT

A manually controlled actuating device is provided to assist in overcoming forces, which resist adjustment of the device into certain positions, and at the same time minimize operator fatigue. The device includes a shaft adjustably mounted for movement from a predetermined rest position along a fixed path and having a spring-biased multiple-input-accepting handle attached to one end of the shaft. The handle is adapted to accept push, pull and squeeze inputs. Disposed adjacent the other end portion of the shaft and in proximity to the shaft's path of movement are a pair of fixedly mounted cam plates having the surfaces thereof adapted to be engaged by a follower pin carried by the shaft. The follower pin is mounted on the shaft for limited movement longitudinally thereof and is interconnected to the handle whereby application of one of the input forces on the handle will effect movement of the follower pin relative to the cam surfaces and permit controlled movement of the shaft from the predetermined rest position. As the shaft moves along its path from the rest position, the follower pin simultaneously follows the cam surfaces. Any longitudinal displacement of the follower pin by the cam surfaces in a direction away from the handle causes increased energization of the handle biasing spring. Upon release of the handle, the shaft will return to the rest position due to the increased energy of the biasing spring being released through the follower pin onto a segment of the cam surfaces causing a force vector to be established overcoming any resistance normally encountered by the shaft in returning to its rest position.

10 Claims, 5 Drawing Figures

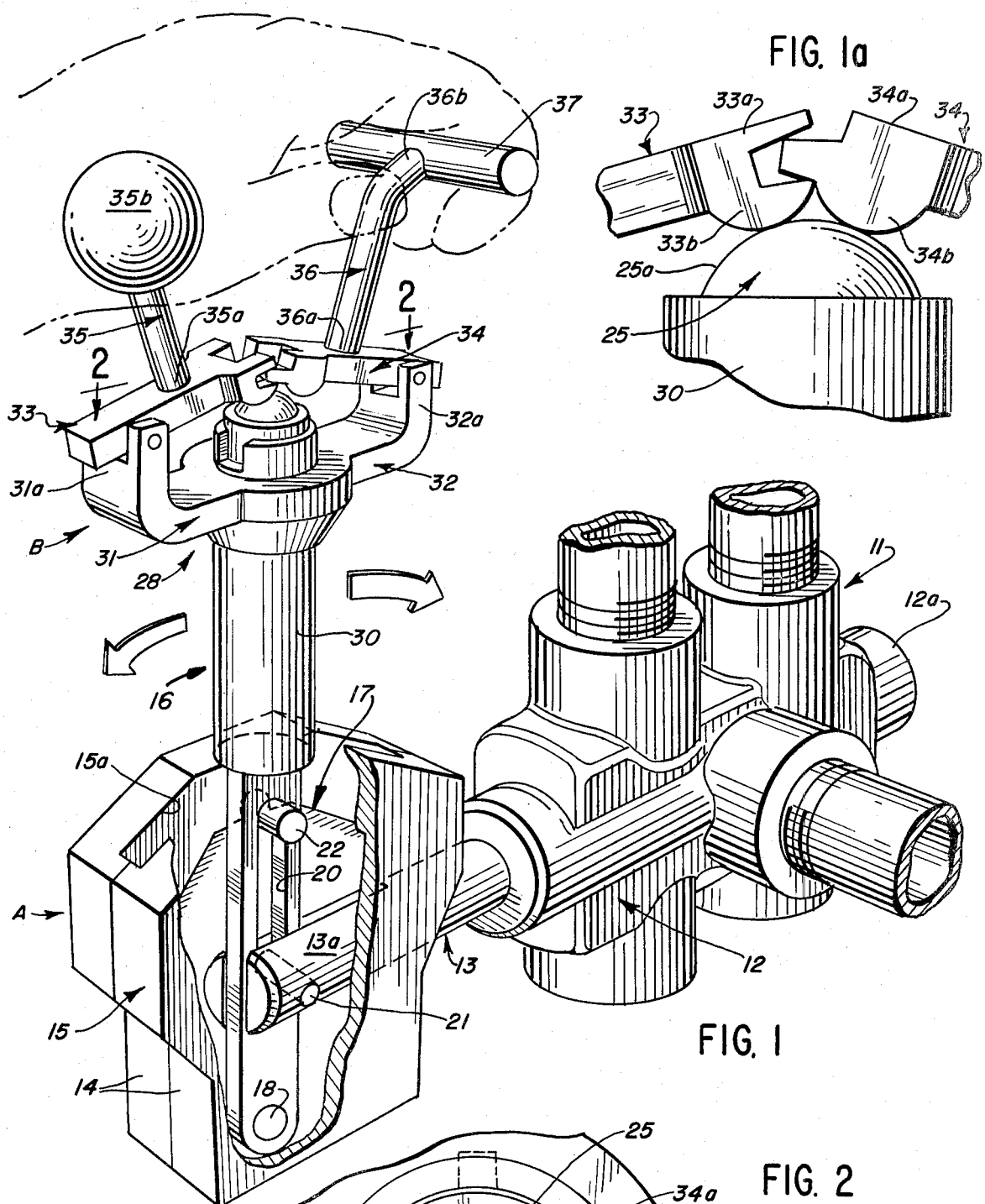
FIG. 1a
FIG. 1
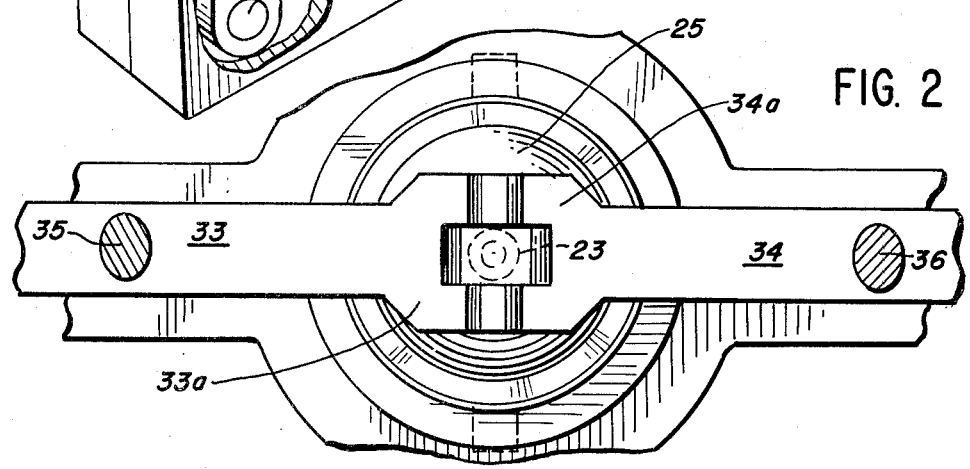
FIG. 2

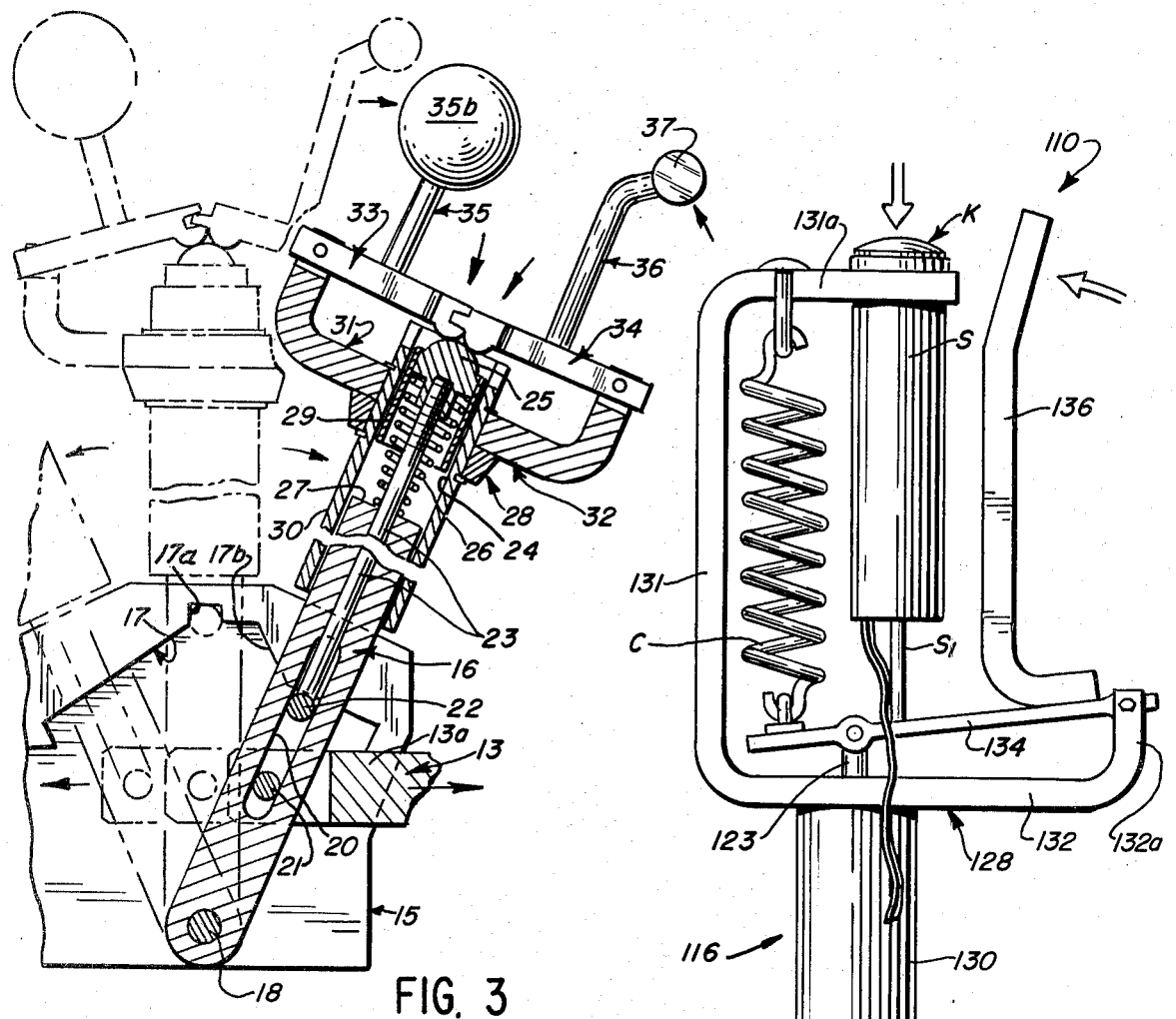
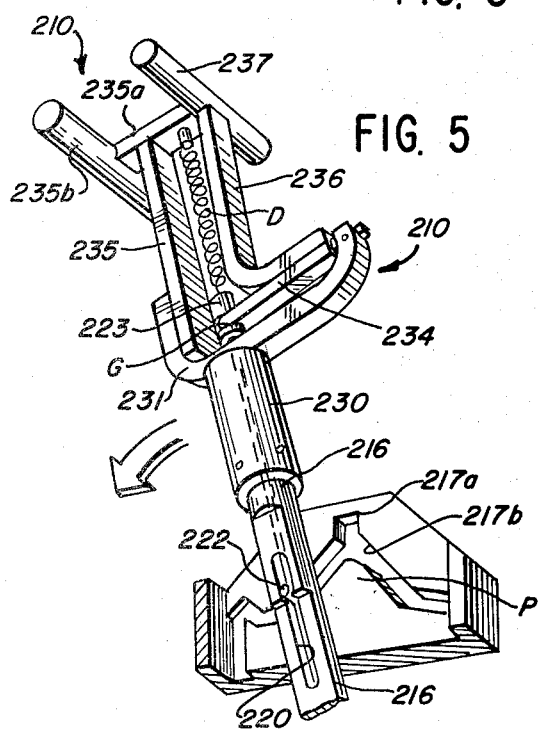
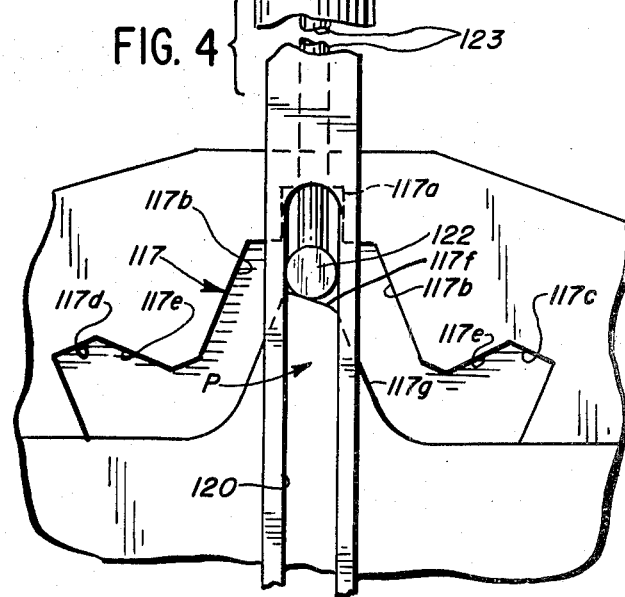
FIG. 3
FIG. 4
FIG. 5

ACTUATING DEVICE

BACKGROUND OF THE INVENTION

In modern hydraulic systems, three position spool valves are commonly employed to control the operation of various types of large oftentimes complex equipment. The activating forces (e.g., push, pull) for adjusting such a valve from a normal rest position are frequently applied by a lever or the like connected to the valve spool.

The main force to be overcome in activating a valve in either direction is the force of the spool centering spring, the function of which is to provide enough force in the closing direction to insure that the valve spool will return to a normal rest (closed) position any time the externally applied actuation force is removed. The common term for this valve characteristic is "dead man control."

The resistance to spool movement is comparatively low in most instances, except in a very narrow range of spool movement which occurs just before the spool closing position is reached wherein the dynamics of high velocity fluid flow within the valve creates a high force tending to resist closing. A high spring force from the spool biasing spring is needed only during this range of movement; however, to achieve this result, a high strength spring will be utilized which offers high resistance to the spool actuation at all points of the actuation stroke. As valves increase in flow capacity this momentary resistance to closing increases and requires the use of stronger centering springs which in turn raise the input forces required for spool actuations. High actuation forces produce serious operator fatigue and at the same time make it more difficult to control small increments of lever motion particularly where careful throttling action is desired.

Heretofore, in an effort to resolve the operator fatigue problems due to the high resistance of the spool biasing spring, various complex and costly pressure compensated valve designs were utilized which enabled moderate size biasing springs to be incorporated in the valve structure. In addition, various force multipliers, or pressure pilot operated control systems, or electrical proportional control systems, were sometimes employed, which in addition to being costly were highly susceptible to malfunction or unreliability due to climatic changes, and required an inordinate amount of maintenance and repair. Furthermore, where the valve required only light input forces to effect acutation thereof, the stability of the valve to remain in its rest, or neutral, position was impaired because of its inability to withstand input forces due to inadvertent bumping by the operator, jarring due to terrain configuration, or due to possible internal pressure imbalances.

SUMMARY OF THE INVENTION

Accordingly, it is an object of the invention to provide an improved, low cost, reliable, simplified manually operated actuating device which minimizes operator fatigue during operation thereof.

It is another object of this invention to provide an actuating device of the type described which will improve the operator's degree of precision control over the movement thereof.

It is still another object of this invention to provide for the automatic release of stored energy within the device during pre-selected segments of the motion of one component thereof to effect return of said component to a predetermined rest position.

It is a further object of the invention to provide simple means for automatically locking the actuating device in pre-selected positions of adjustment.

It is a further object of the invention to provide means whereby the actuating device is automatically adjusted to an unlocked position with the application of input forces used to actuate the device in a given direction from a rest position.

It is a still further object of the invention to provide an actuating device which is capable of being used with a variety of apparatus to accurately control or program the operation of such apparatus under widely varying operating conditions.

In accordance with one embodiment of the invention, an actuating device is provided which is connected to a spool valve or the like and is adapted to accurately regulate the adjustment thereof. The device includes an elongated shaft mounted to normally assume a predetermined rest position and adapted to be manually moved therefrom along a predetermined path which is defined by a pair of fixed, relatively spaced cam plates to effect the desired adjustment of the control valve. Attached to one end of the shaft is a spring biased multiple-input-accepting handle which is adapted to accept manually applied push, pull and/or squeeze forces. Connected to an end portion of the shaft and spaced from the handle, is an adjustable component (e.g., spool) of the control valve. The valve spool is spring biased to assume a predetermined rest (e.g., closed) position. Carried on the shaft is an adjustable follower pin which engages the adjacent cam surfaces formed on the cam plates. The follower pin is interconnected to the handle and is movable relative to the shaft in response to an input force applied to the handle thereby enabling the shaft to be manually moved along its path in a given direction from its rest position upon continued application of either a push or pull force to the handle. The spring bias exerted on the handle urges the follower pin to normally engage the cam surfaces; thus, upon release of the handle, the force of the spring bias exerted through the follower pin onto the cam surfaces will cause the shaft to return to its normal rest position. Just prior to the spool reaching its closed position the follower pin coacts with portions of the cam surface to cause a substantial force vector to be established which moves the shaft to the desired rest position. This force vector combines with the spring bias exerted on the valve spool to readily overcome the substantial flow force normally encountered by the spool just prior to the latter reaching its fully closed position. Thus, by reason of the implementation of the force vector to that of the spool bias, the strength of the spool biasing spring may be significantly reduced, thereby reducing the push or pull input force required to be applied to the handle to effect the desired adjustment of the spool from its closed position. It has been found that, when a compound input force (e.g., squeeze force in combination with either a push or pull force) is imparted to the handle to effect adjustment of the shaft, the fatigue experienced by the operator is substantially reduced.

DESCRIPTION

For a more complete understanding of the invention reference should be made to the drawings, wherein:

FIG. 1 is a fragmentary, perspective view of a preferred embodiment of the improved actuating device shown in its rest, or inoperative, position; a portion of the exterior of the device has been cut away so as to show the concealed connection between the device and a spool of a three position hydraulic spool valve.

FIG. 1a is an enlarged fragmentary side elevational view of a segment of the device of FIG. 1.

FIG. 2 is an enlarged fragmentary sectional view of the device taken along line 2—2 of FIG. 1.

FIG. 3 is an enlarged fragmentary side elevational view of the device of FIG. 1 showing the shaft thereof in its forwardmost push position of adjustment; the device being shown in phantom lines in its center or rest position.

FIG. 4 is an enlarged fragmentary side elevational view of a second embodiment of the improved device with the shaft thereof shown in its center or rest position.

FIG. 5 is a fragmentary, bottom perspective view of a third embodiment of the improved device with the shaft thereof being shown disposed intermediate its rest position and its rearmost pull position and with a squeeze force having been fully applied to the handle of the shaft.

Referring now to the drawings and more particularly to FIG. 1, a preferred embodiment of the improved actuating device 10 is shown used in conjunction with a three position hydraulic spool valve 11 of conventional design. The valve 11 includes a housing 12 in which is disposed an elongated spool, not shown, mounted for selective longitudinal adjustment to effect controlled fluid flow through the valve. Also embodied within the valve housing 12 is a biasing spring, also not shown, which is adapted to cause the spool to normally assume a rest position wherein fluid flow through the valve is terminated. A removable cap 12a is provided to permit access to the spring when required. Extending from the end of the spool is an elongated arm 13 to which the actuating device 10 is connected, as will be described more fully hereinafter.

Device 10, as seen in FIG. 1, includes two basic assemblies, namely, a cam guide assembly A and a compound lever assembly B.

Assembly A is provided with a pair of plate members 14 which may be secured to one another to form a hollow casing 15 open at the top 15a to accommodate a portion of a shaft 16. The shaft forms a component of assembly B. Disposed within the interior of casing 15 are cam surfaces 17 which are formed within portions of the opposing surfaces of plate members 14. The cam surfaces 17 are disposed on opposite sides of the shaft portion extending through the open top of the casing and form a predetermined path in which the shaft may travel.

In the illustrated embodiment of device 10, the lower end of shaft 16 is pivotally connected at 18 to the plate members 14. Formed in the shaft portion, disposed within casing 15, is an elongated longitudinally extending clevis slot 20. Slidably engaging the lower end portion of slot 20 is a transversely extending pin 21 which connects the shaft 16 to the bifurcated end 13a of the arm 13 attached to the spool of valve 11. The arm end 13a extends through a suitable side opening formed in the casing 15 and straddles the slotted shaft portion.

Slidably disposed within the upper portion of slot 20 is a transversely extending follower pin 22 having the opposite ends thereof engaging corresponding portions of the cam surfaces 17. As seen in FIG. 3, follower pin 22 is fixedly attached to the lower end of an elongated rod 23 which is mounted for endwise movement within an axial bore 24 formed in the upper exposed portion of shaft 16. Affixed to the upper end of rod 23 is an end piece 25 having a rounded exterior portion 25a. Disposed beneath end piece 25 and encompassing a portion of rod 23 is a coil spring 26. The upper end of spring 26 resiliently engages the underside of end piece 25, and the lower end of spring 26 resiliently engages an end shoulder 27 formed on shaft 16. Thus, spring 26 biases rod 23 and end piece 25 in an upward direction thereby causing follower pin 22 to resiliently engage the cam surfaces 17. A cylindrical skirt 29 depends from end piece 25 and serves as a sliding guide therefor.

The rod 23, end piece 25, skirt 29 and spring 26 all form components of the compound lever assembly B. In addition to these components, assembly B includes a yoke unit 28 having a sleeve-like center section 30 which is adapted to accommodate the upper portion of rod 23, end piece 25, skirt 29 and spring 26. The lower end of section 30 is fixedly secured to the upper end of shaft 16. Extending laterally outwardly in opposite directions from the upper end of center section 30 is a pair of arms 31 and 32. The outer end portions 31a, 32a of the arms are offset upwardly and each has pivotally connected thereto an end of an elongated force bar 33, 34. The force bars extend toward one another and have the distal ends 33a, 34a thereof engaging one another in a loosely intermeshing relation, see FIG. 1a. The underside 33b, 34b of each distal end has a semicircular configuration which is in continuous rolling sliding contact with the rounded exterior surface 25a of end piece 25.

Carried by force bar 33 and disposed between the pivotal connection thereof and the distal end 33a is an upwardly extending palm ball lever 35. The lower end 35a of the lever 35 is rigidly attached to force bar 33 and the upper end 35b thereof is ball-shaped so as to comfortably fit within the palm of the operator's hand.

In a similar manner force bar 34 is provided with an upwardly extending lever 36 having the lower end 36a thereof affixed to bar 34. A crossbar 37 is affixed to and extends transversely from the upper end 36b of lever 36 and is adapted to be engaged by the fingers of the operator's hand. Thus, when the operator's hand engages the lever ends 35b, 36b and exerts a squeezing force thereon, the ends 35b, 36b move toward one another and cause the force bars 33, 34 to exert a downward endwise force on end piece 25 and, if such force is greater than the biasing force of spring 26, the rod 23 will move downwardly relative to shaft 16 and follower pin 22 will become disengaged from the cam surfaces 17.

It will be noted in FIG. 3 that the cam surfaces 17 are each provided with a centrally disposed upwardly extending notch or recess 17a into which the corresponding end of the follower pin 22 is positioned when the shaft 16 assumes its center or rest position, see FIG. 1. Because of the size and shape of the notch 17a and the force of biasing spring 26, the follower pin assumes a locked position with respect to the cam surfaces and, thus, the shaft cannot be accidentally released from its rest position without the operator exerting a conscious squeezing force of a predetermined magnitude on the lever assembly B.

The configuration of the notch 17a may vary from that shown, as well as the force of the biasing spring and these factors will depend upon the positiveness of the locking engagement desired to retain the shaft in its rest position.

Once the follower pin has been released from the notches 17a by the necessary squeezing force, the shaft may be readily moved in a clockwise or counterclockwise direction by applying a push or pull force on the lever assembly. The configuration of the cam surfaces will determine to a certain degree, in addition to the force of the valve spool biasing spring, the amount of resistance which will be encountered in moving the follower pin along the cam surfaces. Because the force required to move the shaft in a desired direction is a compound force input (e.g., squeeze force plus a push or pull force) the fatigue experienced by the operator of any one set of muscles is minimized. Furthermore, the utilization of a squeeze input force enables the operator to more readily adjust the shaft in shorter more controlled increments than would normally be the case wherein only a push or pull force was applied. Adding significantly to the ease and accuracy of the adjustment is the fact that a smaller (weaker) valve spool biasing spring may be embodied in the valve 11 to return the spool to its rest (closed) position, as will be described more fully hereinafter.

As aforenoted, in hydraulic three position valves the force required to move the spool to a closed position normally is the greater just prior to the spool reaching its closed position due to an inordinately high resistance produced by the hydraulic fluid flow. Accordingly, because of this fact the biasing spring must be of sufficient strength so as to impart a force which will effectively overcome the highest flow resistance which will normally be encountered by the spool. It is for this reason, therefore, that in numerous prior manually controlled actuating devices the operator was required to continuously overcome the spool biasing force when moving the spool from its rest position to various positions of adjustment and thus such effort produced substantial fatigue after only a short period of time. In the improved actuating device, as illustrated, the spring biasing force applied to the spool during the aforenoted critical period of adjustment is a compound force which includes the force of a smaller (weaker) valve spring (not shown) in combination with the vector of force provided by the spring 26 acting through the follower pin 22 against segments 17b of the cam surfaces 17. The curvilinear motion of the shaft 16 is thus transferred to a linear motion through the pin 21 carried by arm end 13a and disposed within shaft slot 20.

The configuration of the cam surfaces 17 will depend upon the type of spool adjustment desired when the operator releases the handle. In the modified form of cam surface 117, shown in FIG. 4, the shaft 116 is caused to be locked in either a forward or rearward terminal position as well as in the center or rest position. To effect locking of the shaft in a forward terminal position, cam surface 117 is provided with a recess 117c, which is annularly spaced from central recess 117a and into which the follower pin is disposed when the operator releases the handle while the shaft is in, or adjacent to, its forward terminal position. A similar recess 117d is also provided in cam surface 117 which is annularly spaced in the opposite direction from the central recess 117a. The follower pin will move into recess 117d when the operator releases the handle while the shaft is in, or adjacent to, its rearmost terminal position. It will be noted in FIG. 4 that one side 117e of each recess 117c, 117d, which is disposed closest to center recess 117a, is inclined away from the center recess and thus, if the operator releases the handle while the follower pin is engaging or adjacent to the side 117e, a vector force will be produced by the biasing force of the follower pin exerted on the side surface 117e urging the shaft 116 to move to either its rearmost or forwardmost terminal position. On the other hand, if the operator releases the handle, while the follower pin is in the vicinity of cam surface segment 117b, a similar vector force will be produced urging the handle to assume its center position.

As seen in FIG. 4, cam surface 117 may also be provided with a lower section having an upwardly projecting central portion P which is disposed in spaced subtending relation with respect to the center recess 117a and the surface segments 117b adjacent thereto. The surface of the top 117f of portion P in the illustrated embodiment is inclined a slight amount in the direction towards recess 117c; thus, when the follower pin is moved downwardly out of recess 117a a sufficient amount so that it will resiliently engage the inclined surface of top 117f of portion P and, if further downward force is exerted on the follower pin by the operator exerting a sqeezing input force, the inclined surface of top 117f will urge the shaft to move in a clockwise direction. The tapered side surfaces 117g of portion P will also assist in the movement of the shaft in either a clockwise or counterclockwise direction provided the follower pin is being continuously urged against the side surface by a squeeze input force alone or in combination with either a push or pull input force. In addition to assisting the operator in moving the shaft in either direction from the center recess when a squeezing input force of predetermined magnitude is continuously applied to the handle, the projecting portion P prevents the operator from moving the shaft from its forward terminal position directly to its rear terminal position, or vice versa, without first moving temporarily at least into the neutral (rest) position. Such a sequence of movement may be important in preventing damage to the equipment being controlled by the actuating device.

It is readily apparent that configuration of the cam surface, including the lower section thereof, may vary over a wide range. Furthermore, the configuration of the cam surface disposed on either side of the central recess may be uniform or nonuniform depending upon the desired return action of the shaft when the handle is released by the operator.

FIG. 4 discloses a second embodiment of the actuating device 110 which includes several components similar to those described with regard to device 10. To facilitate structural understanding of the structural similarities between devices 10 and 110, the corresponding components of device 110 are identified by like numerals except in the one hundred series. In lieu of the end piece 25 affixed to the upper end of rod 23 in device 10, the upper end of rod 123 in device 110 projects beyond the end of the shaft 116 and is pivotally connected to a force bar 134. One end of bar 134 is pivotally connected to an offset end 132a of an arm 132 forming a part of a yoke unit 128 affixed to the upper end of shaft 116. The distal end of force bar 134 is connected to an end of a coil spring C. The opposite end of spring C is connected to an offset portion 131a of a second arm 131 forming a part of yoke unit 128. The spring C provides the bias for rod 123 and serves to maintain force bar 134 in the rest position when the operator releases the handle.

Affixed to and extending upwardly from force bar 134, is an elongated lever 136 which is adapted to be engaged by the palm of the operator's hand. The fingers of the operator's hand, in turn, embrace the fixed arm 131 of the yoke unit 128 and upon a predetermined manual squeezing force being applied between the arm 131 and lever 136, the force bar 134 will pivot in a counterclockwise direction causing a downward endwise force to be applied to the upper end of rod 123 releasing the follower pin 122 from the center recess 117a formed in each cam surface 117. To implement the squeezing force required and thus reduce the manual effort required, a solenoid S may be provided which is fixedly secured to the offset portion 131a and depends therefrom, as seen in FIG. 4. An elongated actuator element $S_1$ protrudes endwise from the solenoid and engages the upper surface of force bar 134 and exerts a downward force thereon, when a button switch K is manually depressed by the thumb of the operator's hand, causing the solenoid to be electrically energized. By depressing the button switch K, the follower pin 122 will be urged against the surfaces 117f, 117g of the upwardly projecting portion P forming a part of the lower section of the cam surface 117. Thus, the force of the solenoid and/or manual squeezing force combine with the push or pull input force of the operator to readily move the shaft 116 in the direction desired and thus accurately control the adjustment of the spool valve to which the actuating device is connected.

A third embodiment of the improved actuating device 210 is shown in FIG. 5 which is similar to device 110, except that an upwardly extending lever 235 is affixed to yoke arm 231 and a finger crosspiece 235b is attched to the upper end of lever 235. The upper end of a biasing spring D is attached to the underside of a cross member 235a attached to the upper end of lever 235, and the lower end of the spring D is connected to an exposed end of the rod 223, see FIG. 5. The exposed end of the rod 223 is provided with an annular groove G which is engaged by the bifurcated distal end of force bar 234. An upwardly extending lever 236 is affixed to force bar 234 and has a finger crosspiece 237 attached to the distal upper end of the lever 236. There is sufficient clearance provided between crosspiece 237 and the free end of cross member 235a so that piece 237 can move towards the end of the cross member 235a when manual squeeze force is applied to the crosspieces 235b, 237. When maximum squeeze force is applied, piece 237 will abut the free end of cross member 235a. Movement of crosspiece 237 towards crosspiece 235b imparts a counterclockwise motion to force bar 234, as viewed in FIG. 5, and, in turn, produces a downward endwise movement of rod 223. Such a downward movement, if of sufficient magnitude, causes follower pin 222 to be released from recesses formed in the cam surface and allows the shaft to respond to push or pull input forces.

In both the modified forms of the actuating device 110 and 210 the shaft thereof may be connected to the spool of a spool valve in the manner as shown and described with respect to device 10. It is to be understood, of course, that the means of connecting the actuating device to a control valve, such as a three-position spool type valve, may vary from that shown without departing from the scope of the invention.

With each form of the improved actuating device 10, 110 or 210, the input forces normally required to move the shaft thereof involves the utilization of various sets of arm and hand muscles in a natural way thereby reducing significantly the fatigue experienced by any one set of muscles. Furthermore, the utilization of compound lever arrangements (e.g., force bar and lever affixed thereto) amplifies the input force applied, thereby requiring an applied force of smaller magnitude to achieve the desired adjustment of the spool valve.

Thus, it will be seen that an improved actuating device has been provided which is of a simple and inexpensive design; provides for a reduced level of actuation effort which is distributed among a larger number of muscles rather than being concentrated in one, or a few muscles; enables more precise motion control to be obtained, especially where small incremental movements are desired; provides for the inclusion of simplified safety locks or operational locks; and utilizes return forces that assure that the apparatus, along with an operated component attached thereto, will return to its center position against any normal forces tending to impede such return. Furthermore, the improved actuating device permits programming the actions and reactions of the device to match individual valve characteristics and to satisfy individual machine operational requirements.

I claim:

1. An actuating device for use in simultaneously converting predetermined input forces into stored energy within the device and into an output force sufficient to overcome a resilient first external resistance of known magnitude and, upon release of the input forces, utilizing the stored energy within the device in combination with the resiliency of the first external resistance to overcome a second external resistance whereby neither the force of the resiliency of the first external resistance nor the force of the stored energy of the device when acting alone is sufficient to overcome same, said device comprising an adjustably mounted shaft means normally positioned at a given rest position and selectively movable therefrom along a predetermined path; first means retaining said shaft means at said given rest position; handle means mounted on and movable as a unit with said shaft means, said handle means being responsive to at least a predetermined squeeze input force and moving said shaft means away from said first means and effecting a single controlled output force overcoming the resilient first external resistance; fixedly mounted cam surface means adjacent said shaft means and disposed along said predetermined path, said cam surface means having segments thereof in proximity to said first means and extending substantial distances therefrom along said path and being angularly disposed relative to the direction of movement of said shaft means along said path; and follower means carried by said shaft means and being selectively movable independently thereof a limited amount, said follower means being operatively connected to said handle means and biased to normally engage said cam surface means, said follower means being disengageable from said cam surface means and said first means upon the application of said predetermined squeeze input force to said handle means and said shaft means being movable from the rest position in response to an additional application to said handle means of an input force of predetermined magnitude; upon release of the input forces on said handle means when the shaft means is within the path and offset from said rest position, said biased follower means coacting with said segments of said cam surface means and producing a vector force combining with the resiliency of the first external resistance to overcome the second external resistance and return said shaft means to said rest position.

2. The actuating device of claim 1 wherein the handle means includes a pair of levers, at least one of said levers being movable relative to the other in response to a predetermined squeeze input force.

3. The actuating device of claim 2 wherein the said one lever is pivotally mounted and the pivotal movement thereof effects linear movement of said follower means substantially longitudinally of said shaft means and disengagement thereof from said cam surface means.

4. The actuating device of claim 3 wherein said shaft means is pivotally mounted and the pivotal axis thereof is offset relative to the pivotal axis of said one lever.

5. The actuating device of claim 2 wherein both levers of said pair are pivotally mounted and movable about spaced substantially parallel pivotal axes, the latter being spaced from a longitudinal axis of said shaft means, said levers having corresponding portions in cooperative relation with one another whereby said levers simultaneously coact and impart a longitudinal force to said shaft means effecting independent movement of said follower means relative to said cam surface means; movement of said levers being effected by either a push or pull input force applied thereto alone or in combination with the squeeze input force.

6. The actuating device of claim 1 wherein the cam surface means includes an upper section normally engaged by said follower means and a lower section spaced therefrom, said lower section being forceably engaged by said follower means upon a squeeze force above a predetermined magnitude being applied to said handle means, both sections having surface segments in proximity to said first means and extending substantial distances therefrom along said path and being angularly disposed relative to the movement of the shaft means along said path, forcible engagement of said follower means with said lower section effecting movement of said shaft means along said predetermined path upon continued application to said handle means of a squeeze input force greater than the force necessary to effect initial engagement between the follower means and the cam surface lower section.

7. The actuating device of claim 1 wherein the first means includes a notch accommodating said follower means only when said shaft means is disposed at said rest position, said notch being adjacent to at least one angularly disposed segment of said cam surface means.

8. The actuating device of claim 7 wherein the first means includes a pair of second notches disposed in spaced relation on opposite sides of said first mentioned notch and along said predetermined path, each second notch being adjacent to an angularly disposed segment of said cam surface means and being adapted to accommodate said follower means only when said shaft means has moved a predetermined distance from said first mentioned notch.

9. The actuating device of claim 2 wherein one of said levers is provided with finger gripping means and the other lever is provided with palm-engaging means.

10. An actuating device for use in simultaneously converting a predetermined number of input forces into stored energy within the device and into an output force in one direction overcoming an external resistance; upon the input force being released, the stored energy alone or in combination with a predetermined external energy source being sufficient to produce a force in an opposite direction overcoming the external resistance; said device comprising an adjustably mounted shaft means normally positioned at one given rest position and selectively movable therefrom along a predetermined path; first means retaining said shaft means at said given rest position; handle means mounted on and movable as a unit with said shaft means; said handle means being responsive to a predetermined squeeze input force alone or in combination with a second input force and effecting a single controlled output force in said one direction moving said shaft means away from said first means and overcoming the external resistance; fixedly mounted cam surface means adjacent said shaft means and disposed along said predetermined path, said cam surface means having segments thereof in proximity to the first means and extending substantial distances therefrom along said path and being angularly disposed relative to the direction of movement of said shaft means along said path; and follower means carried by said shaft means and movable therewith and being selectively movable a limited amount independently thereof at any position of said shaft means along said path, said follower means being operatively connected to said handle means and being biased by stored energy within said handle means and normally assuming a resilient engagement with said cam surface means; when said shaft means is retained by said first means in the rest position, said follower means being disengageable therefrom only when at least a predetermined squeeze input force is applied to said handle means overcoming the biasing force of said stored energy, whereupon said shaft means is movable along said path in response to the application of an additional input force of predetermined magnitude; upon release of the input force to said handle means when the shaft means is within the path and offset from the rest position, the biasing force of the stored energy through said follower means coacts with said angularly disposed segment of the cam surface means and either alone or in combination with a predetermined external energy source produces a vector force in the opposite direction overcoming the external resistance and returning said shaft means to the rest position.

* * * * *